(No Model.) 2 Sheets—Sheet 1.
J. MUSGRAVE & A. WALSH.
SAFETY GEAR FOR STARTING ENGINES.

No. 309,557. Patented Dec. 23, 1884.

(No Model.) 2 Sheets—Sheet 2.

J. MUSGRAVE & A. WALSH.
SAFETY GEAR FOR STARTING ENGINES.

No. 309,557. Patented Dec. 23, 1884.

UNITED STATES PATENT OFFICE.

JOHN MUSGRAVE AND ARTHUR WALSH, OF BOLTON, COUNTY OF LANCASTER, ENGLAND.

SAFETY-GEAR FOR STARTING ENGINES.

SPECIFICATION forming part of Letters Patent No. 309,557, dated December 23, 1884.

Application filed October 9, 1884. (No model.) Patented in England August 24, 1881, No. 3,694.

*To all whom it may concern:*

Be it known that we, JOHN MUSGRAVE and ARTHUR WALSH, both subjects of the Queen of Great Britain, residing at Bolton, in the county of Lancaster, England, have invented a new and useful Safety-Gear for Starting Engines, (for which we have obtained a patent in Great Britain, No. 3,694, bearing date August 24, 1881,) of which the following is a specification.

Our invention relates to improvements in safety-gear for starting engines; and the object of our invention is to prevent accidents arising from the starting-gear having been left in gear with the fly-wheel or other wheel of the large engine after the latter has attained its normal speed. We attain these objects by the mechanism illustrated in the accompanying two sheets of drawings, in which—

Figure 1:
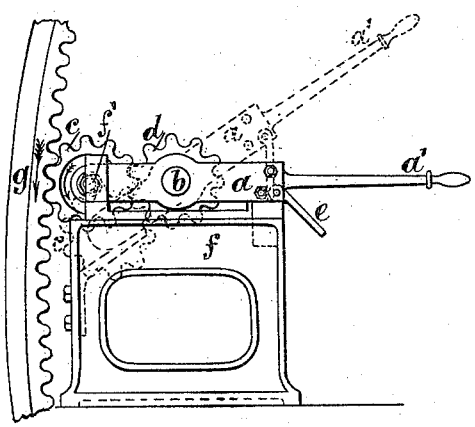
Figure 2:
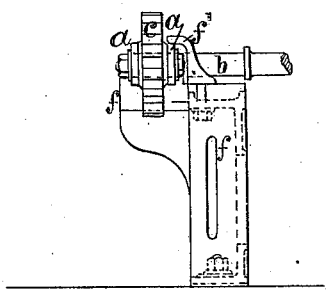
Figure 3:
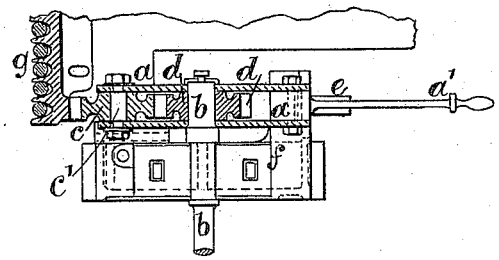
Figure 4:
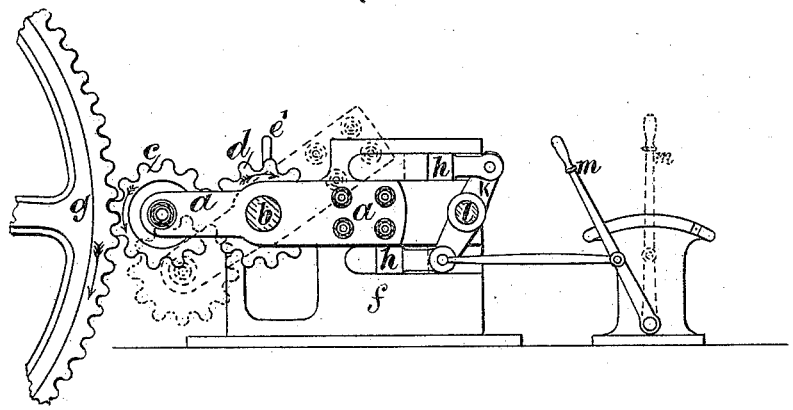

Figure 1 is a side elevation, Fig. 2 an end elevation, (the fly-wheel of the large engine being removed,) and Fig. 3 a plan, partly in section, of our improved safety starting-gear. Fig. 4 is an elevation, and Fig. 5 a plan, of our improved safety starting-gear fitted with stops, so that it may be driven in either direction.

Similar letters refer to similar parts throughout the several views.

$a$ is a lever fulcrumed or pivoted on the revoluble shaft $b$, on which is keyed or secured a pinion, $d$, gearing into a pinion, $c$, which is free to turn on a stud, $c'$, at one end of the lever $a$, to the other end of which is fixed a handle, $a'$.

$e$ is a catch that swings on a stud on the lever $a$, so that when the lever is raised the catch rests on the frame $f$.

$g$ is the fly-wheel or main drum of the large engine, provided with internal teeth, into which the teeth of the pinion $c$ gear. The shaft $b$ is free to turn in a bearing fixed to the frame $f$, and on it is keyed a worm-wheel, into which gears a worm that may be turned by a handle or driven by a small engine. Instead of a worm and worm-wheel other suitable gearing may be employed for actuating the shaft $b$. There is a stop-piece, $f'$, fixed to the frame $f$, against which one end of the lever $a$ bears when in a horizontal position, the other end of the lever resting on a projecting portion of the frame $f$.

When it is desired to start the large engine, motion is communicated to the shaft $b$ by hand or by a small engine, and the lever $a$ is moved by the handle $a'$ to bring it into a horizontal position. While the shaft $b$ revolves motion is transmitted by the pinion $d$ to the pinion $c$, and as the lever $a$ approaches the horizontal position the teeth of the pinion $c$ work themselves into gear with the teeth inside the fly-wheel or drum $g$.

When the engine has been started by these means, and has attained sufficient speed to become the driver instead of the driven, it throws the pinion $c$ out of gear, raising the lever $a$ to the position shown in dotted lines on Fig. 1, when the catch $e$ will rest on the projecting portion of the frame $f$ and retain the lever in this position till it be again required to start the engine.

Figure 5:
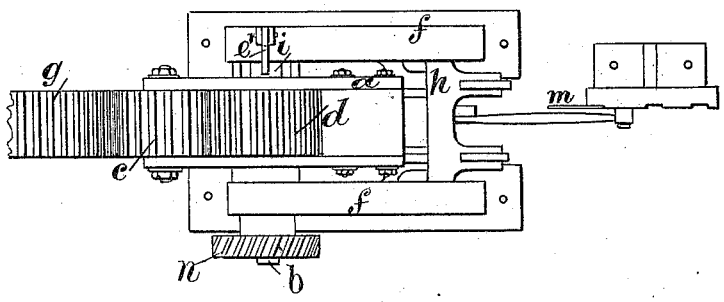

In the arrangement illustrated by Figs. 4 and 5 the lever $a$ is weighted so as to balance the pinion $c$. A catch, $e'$, is fitted loosely on a stud connected to the frame, and when the lever $a$ is in the position shown in dotted lines on Fig. 4, or in the reverse position, with the pinion $c$ above the level of the shaft $b$, one end of this catch $e'$ falls into a recess in a collar, $i$, fixed to the lever $a$.

$h$ $h$ are two stop-pieces, one of which is moved below or above the end of the lever $a$, according to the direction in which the wheel $g$ of the large engine is to be turned. These stop-pieces $h$ are pivoted to and connected by the lever $k$ on the fulcrum-stud $l$ to the starting-handle $m$ of a small starting-engine. (Not shown on the drawings.) This engine gives motion to a worm, which gears into and drives the worm-wheel $n$, fixed on the shaft $b$, (see Fig. 5,) and this motion is transmitted by the pinion $d$ to the pinion $c$. When the handle $m$ is in the position shown by dotted lines on Fig. 4, the starting-engine will be stopped, and the lever $a$ and the stop-pieces $h$ $h$ will also occupy the positions shown in dotted lines. If the large wheel $g$ were running in the direction opposite to that indicated by the arrow, the pinion $c$, when thrown out of gear, would be above the center of the shaft $b$, instead of below it. The catch $e'$ will always retain the lever $a$, either up or down, until it has been released, so that the pinion $c$ cannot get into gear with the wheel $g$ after it has been thrown out of gear.

We have shown and described the pinion $c$ applied directly to the fly-wheel or main drum of the large engine. It is obvious, however, that it might be applied to other wheels, if more convenient—such as a wheel on the second-motion shaft.

By the use of our invention an engine may be readily started, and the starting-gear may be easily and quickly thrown out of gear without noise or jar or any risk of injury to the operator or to the gear.

We declare that what we claim and desire to secure by Letters Patent of the United States is—

1. In starting-gear for large engines, the combination, with the fly-wheel, main drum, or other wheel of a large engine, of a pinion or starting-wheel actuated by hand or power, the said pinion being so mounted that it may be moved into gear with the fly-wheel, and be thrown out of gear by the motion of the fly-wheel when the latter becomes the driver, substantially as and for the purpose herein set forth.

2. The combination, with the driving-wheel $g$, of the pinion $c$, fitted on the lever $a$, provided with a handle, $a'$, catch $e$, and stop-piece $f'$, and pivoted to a shaft, $b$, the said pinion $c$ gearing into the pinion $d$, secured to the said shaft $b$, which is fitted in bearings in the frame $f$, and is actuated either by hand or by a small engine, all substantially as herein shown and described, for the purposes specified.

3. The combination, with the driving-wheel $g$, of the pinion $c$, mounted on the weighted balance-lever $a$ and gearing into the pinion $d$, secured to the shaft $b$, to which is also secured the collar $i$, provided with recesses for the end of the pivoted catch $e'$ and the said lever $a$, the latter retained in position, according to the direction in which the wheel $g$ is to be driven, by one or other of the stop-pieces $h\,h$, connected by the lever $k$, fulcrumed at $l$ to the starting-handle $m$, all substantially as herein shown and described, for the purposes specified.

The foregoing specification of our improvement in safety-gear for starting engines signed by us this 22d day of September, 1884.

JOHN MUSGRAVE.
     ARTHUR WALSH.

Witnesses:
 ARTHUR WM. BROUGHTON,
  *Clerk, Bolton.*
 JOHN CROMPTON,
  *Engineer.*